United States Patent
Yamada (10) Patent No.: US 8,190,340 B2
(45) Date of Patent: May 29, 2012

(54) SHIFT CONTROL DEVICE FOR AUTOMATIC TRANSMISSION AND CONTROL METHOD THEREOF

(75) Inventor: Naohiro Yamada, Atsugi (JP)

(73) Assignee: JATCO Ltd, Fuji-shi (JP)

( * ) Notice: Subject to any disclaimer, the term of this patent is extended or adjusted under 35 U.S.C. 154(b) by 640 days.

(21) Appl. No.: 12/391,527

(22) Filed: Feb. 24, 2009

(65) Prior Publication Data

US 2009/0228179 A1    Sep. 10, 2009

(30) Foreign Application Priority Data

Mar. 7, 2008    (JP) ................................. 2008-057987

(51) Int. Cl.
*F16H 61/00* (2006.01)

(52) U.S. Cl. ............................... 701/55; 701/66; 477/91

(58) Field of Classification Search ........................ None
See application file for complete search history.

(56) References Cited

U.S. PATENT DOCUMENTS

| | | | | |
|---|---|---|---|---|
| 5,035,157 A | * | 7/1991 | Aoki et al. | ..................... 477/128 |
| 5,044,230 A | * | 9/1991 | Shinya et al. | ................. 477/119 |
| 5,393,278 A | | 2/1995 | Kyushima et al. | |
| 5,857,937 A | | 1/1999 | Ashizawa et al. | |
| 6,694,241 B2 | * | 2/2004 | Kim | ................................ 701/55 |
| 7,377,877 B2 | | 5/2008 | Ogata | |

FOREIGN PATENT DOCUMENTS

| | | |
|---|---|---|
| JP | 03-103661 A | 4/1991 |
| JP | 07-259975 A | 10/1995 |
| JP | 09-126313 A | 5/1997 |
| JP | 09-210159 A | 8/1997 |
| JP | 11-048830 A | 2/1999 |
| JP | 2003-254426 A | 9/2003 |
| JP | 2005-076800 A | 3/2005 |
| JP | 2009-144801 A | 7/2009 |

OTHER PUBLICATIONS

U.S. Appl. No. 12/391,515, filed Feb. 24, 2009, Yamada.
U.S. Appl. No. 12/391,545, filed Feb. 24, 2009, Yamada.
N. Yamada, U.S. PTO Notice of Allowance and Allowability, U.S. Appl. No. 12/391,545, dated Oct. 19, 2011, 13 pages.

* cited by examiner

*Primary Examiner* — Michael J. Zanelli
(74) *Attorney, Agent, or Firm* — Foley & Lardner LLP (57) ABSTRACT

In a shift control device for an automatic transmission according to this invention, when the engine load increases such that a shift to a first gear position on a low speed side of a current gear position is required, control is performed to calculate an estimated vehicle speed following the elapse of a time required to shift to the first gear position and set a second gear position from the estimated vehicle speed and the engine load on the basis of the shift map. When the first gear position is on the low speed side of the second gear position, a shift is performed to a gear position on a high speed side of the first gear position.

6 Claims, 8 Drawing Sheets

-- Prior Art --

-- Prior Art --

-- Prior Art --

FIG. 8

SHIFT CONTROL DEVICE FOR AUTOMATIC TRANSMISSION AND CONTROL METHOD THEREOF

FIELD OF THE INVENTION

This invention relates to shift control in a stepped automatic transmission, in particular shift control performed during a kickdown.

BACKGROUND OF THE INVENTION

In a stepped automatic transmission, shift control is performed in accordance with a shift map defined by a vehicle speed and a throttle opening. JP2003-254426A discloses determining a look-ahead vehicle speed during deceleration of a vehicle from the deceleration rate of the vehicle, making a shift determination on the basis of the look-ahead vehicle speed, and that as a result, the shift determination can be made earlier. Thus, a situation in which a shift occurs at a delay relative to a schedule determined by a shift line is prevented.

SUMMARY OF THE INVENTION

However, in the conventional technique described above, problems remain in a traveling condition where an accelerator pedal is pressed hard. Specifically, in a case where the accelerator pedal is pressed when a current gear position is a second speed, for example, thereby increasing the throttle opening such that an operating condition crosses a 2→1 downshift line on the shift map and a downshift to a first speed is determined, the following problem occurs if the operating condition based on the look-ahead vehicle speed at this time shifts to the vicinity of a low vehicle speed side of a 1→2 upshift line or crosses the 1→2 upshift line to shift to a high vehicle speed side.

In the former case, the operating condition crosses the 1→2 up line immediately after a 2→1 downshift is performed in accordance with the depression of the accelerator pedal, and therefore an upshift is performed immediately after completing the downshift. As a result, the traveling period in the first speed is reduced such that the driver cannot obtain the intended acceleration, and shift shock occurs twice, i.e. from the second speed to the first speed and from the first speed to the second speed.

In the latter case, the 2→1 downshift is not yet completed when the operating condition based on the look-ahead vehicle speed crosses the 1→2 up line, and therefore the 1→2 upshift is begun after the 2→1 downshift is completed. Hence, the upshift is begun immediately after completion of the downshift, and as a result, the traveling period in the first speed is reduced such that the driver cannot obtain the intended acceleration and shift shock occurs twice. Moreover, the start of the upshift is delayed, leading to a delay in reduction of an engine rotation speed, and as a result, engine rotation overspeed may occur.

It is an object of this invention to prevent shift-busy and shift shock caused when an upshift is performed immediately after completion of a downshift in a traveling condition where an accelerator pedal is pressed hard.

In order to achieve the above object, this invention provides a shift control device for an automatic transmission that comprises a shift map which is defined by an engine load and a vehicle speed and divided into gear position regions by shift lines, a target gear position setting unit that sets a target gear position according to the region of the shift map in which an operating condition, which is determined by the engine load and the vehicle speed, is located, a shift control unit that performs shift control on the basis of the target gear position, a vehicle speed estimating unit that estimates the vehicle speed following the elapse of a time required to shift to a first gear position on a low speed side of a current gear position when the engine load increases such that a shift to the first gear position is required, and a second gear position setting unit that sets a second gear position from the estimated vehicle speed and the engine load on the basis of the shift map, and that the target gear position setting unit sets a gear position on a high speed side of the first gear position as the target gear position when the first gear position is on the low speed side of the second gear position.

This invention also provides a shift control method for an automatic transmission having a shift map defined by an engine load and a vehicle speed and divided into gear position regions by shift lines that comprises setting a target gear position according to the region of the shift map in which an operating condition, which is determined by the engine load and the vehicle speed, is located, performing shift control on the basis of the target gear position, estimating the vehicle speed following the elapse of a time required to shift to a first gear position on a low speed side of a current gear position when the engine load increases such that a shift to the first gear position is required, and setting a second gear position from the estimated vehicle speed and the engine load on the basis of the shift map, and that the setting the target gear position sets a gear position on a high speed side of the first gear position as the target gear position when the first gear position is on the low speed side of the second gear position.

The details as well as other features and advantages of this invention are set forth in the remainder of the specification and are shown in the accompanying drawings.

DESCRIPTION OF THE PREFERRED EMBODIMENTS

Figure 1:
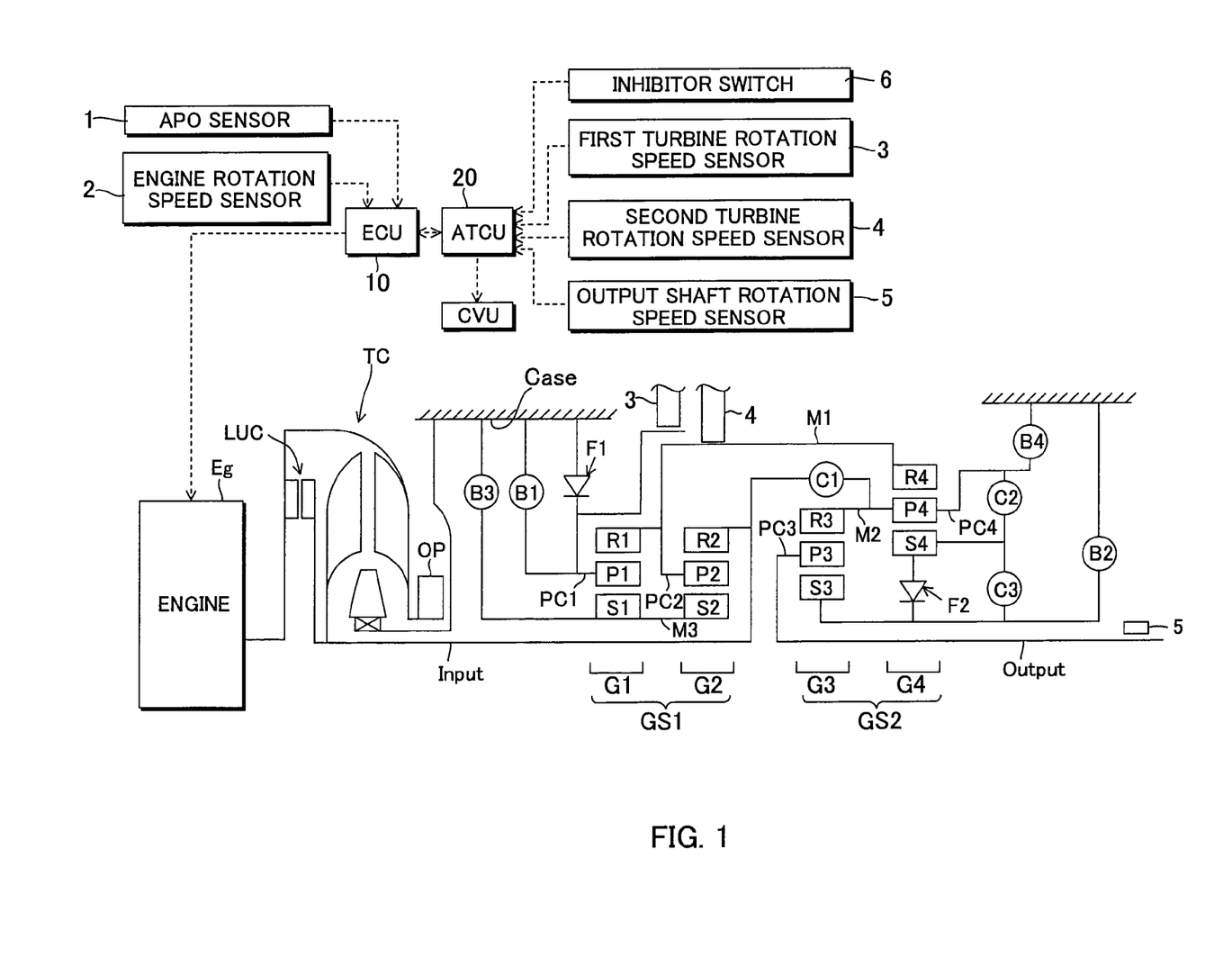
FIG. 1 is a schematic diagram showing the constitution of an automatic transmission according to an embodiment.

An embodiment of this invention will be described in detail below with reference to the figures and so on. FIG. 1 is a schematic diagram showing the constitution of an automatic transmission according to the embodiment. The automatic transmission of this embodiment is a stepped automatic transmission having seven forward speeds and one reverse speed, in which a driving force of an engine Eg is input from an input shaft Input via a torque converter TC, whereupon a rotation speed is shifted by four planetary gears and seven friction engagement elements and output from an output shaft Output. Further, an oil pump OP is provided coaxially with a pump impeller of the torque converter TC and driven to rotate by the driving force of the engine Eg to pressurize oil.

An engine controller (ECU) 10 that controls a driving condition of the engine Eg, an automatic transmission controller (ATCU) 20 that controls a shift condition and so on of the automatic transmission, and a control valve unit CVU that controls an oil pressure of the respective engagement elements on the basis of an output signal from the ATCU 20 are also provided. The ECU 10 and ATCU 20 are connected via a CAN communication line or the like, and communicate with each other to share sensor information and control information.

An APO sensor 1 that detects an accelerator pedal operation amount of a driver and an engine rotation speed sensor 2 that detects an engine rotation speed are connected to the ECU 10. The ECU 10 controls the rotation speed and torque of the engine by controlling a fuel injection amount and a throttle opening on the basis of the engine rotation speed and the accelerator pedal operation amount.

A first turbine rotation speed sensor 3 that detects a rotation speed of a first carrier PC1, a second turbine rotation speed sensor 4 that detects a rotation speed of a first ring gear R1, an output shaft rotation speed sensor 5 that detects a rotation speed of the output shaft Output (a vehicle speed), and an inhibitor switch 6 that detects a shift lever operating condition of the driver are connected to the ATCU 20. The ATCU 20 selects an optimum command gear position based on a vehicle speed Vsp and an accelerator pedal operation amount APO in a D range, and outputs a control command for achieving the command gear position to the control valve unit CVU.

Next, a shift gear mechanism that changes the rotation speed of the input shaft Input and transmits the rotation to the output shaft Output will be described. A first planetary gear set GS1 and a secondary planetary gear set GS2 are arranged in the shift gear mechanism in sequence from the input shaft Input side to the output shaft Output side in an axial direction. Further, a plurality of clutches C1, C2, C3 and brakes B1, B2, B3, B4 are provided as the friction engagement elements, as well as a plurality of one-way clutches F1, F2.

A first planetary gear G1 is a single-pinion type planetary gear having a first sun gear S1, a first ring gear R1, and a first carrier PC1 supporting a first pinion P1 that is meshed to the two gears S1, R1. A second planetary gear G2 is a single-pinion type planetary gear having a second sun gear S2, a second ring gear R2, and a second carrier PC2 supporting a second pinion P2 that is meshed to the two gears S2, R2. A third planetary gear G3 is a single-pinion type planetary gear having a third sun gear S3, a third ring gear R3, and a third carrier PC3 supporting a third pinion P3 that is meshed to the two gears S3, R3. A fourth planetary gear G4 is a single-pinion type planetary gear having a fourth sun gear S4, a fourth ring gear R4, and a fourth carrier PC4 supporting a fourth pinion P4 that is meshed to the two gears S4, R4.

The input shaft Input is connected to the second ring gear R2 and inputs a rotary driving force from the engine Eg via the torque converter TC and so on. The output shaft Output is connected to the third carrier PC3 and transmits an output rotary driving force to a drive wheel via a final gear and so on.

A first connecting member M1 connects the first ring gear R1, the second carrier PC2, and the fourth ring gear R4 integrally. A second connecting member M2 connects the third ring gear R3 and the fourth carrier PC 4 integrally. A third connecting member M3 connects the first sun gear S1 and the second sun gear S2 integrally.

The first planetary gear set GS1 is constituted by four rotary elements obtained by connecting the first planetary gear G1 to the second planetary gear G2 using the first connecting member M1 and the third connecting member M3. The second planetary gear set GS2 is constituted by five rotary elements obtained by connecting the third planetary gear G3 to the fourth planetary gear G4 using the second connecting member M2.

In the first planetary gear set GS1, torque is input into the second ring gear R2 from the input shaft Input, whereupon the input torque is output to the second planetary gear set GS2 via the first connecting member M1. In the second planetary gear set GS2, torque is input directly into the second connecting member M2 from the input shaft Input and into the fourth ring gear R4 via the first connecting member M1, whereupon the input torque is output to the output shaft Output from the third carrier PC3.

An input clutch C1 connects and disconnects the input shaft Input and the second connecting member M2 selectively. A direct clutch C2 connects and disconnects the fourth sun gear S4 and the fourth carrier PC4 selectively.

An H&LR clutch C3 connects and disconnects the third sun gear S3 and the fourth sun gear S4 selectively. Further, a second one-way clutch F2 is disposed between the third sun gear S3 and the fourth sun gear S4. Thus, when the H&LR clutch C3 is disengaged and the rotation speed of the fourth sun gear S4 is higher than that of the third sun gear S3, the third sun gear S3 and fourth sun gear S4 generate independent rotation speeds. As a result, the third planetary gear S3 and the fourth planetary gear G4 are connected via the second connecting member M2, and the respective planetary gears achieve independent gear ratios.

A front brake B1 stops rotation of the first carrier PC1 selectively. Further, the first one-way clutch F1 is disposed parallel with the front brake B1. A low brake B2 stops rotation of the third sun gear S3 selectively. A 2346 brake B3 stops rotation of the third connecting member M3, which connects the first sun gear S1 to the second sun gear S2, selectively. A reverse brake B4 stops rotation of the fourth carrier PC4 selectively.

Figure 2:
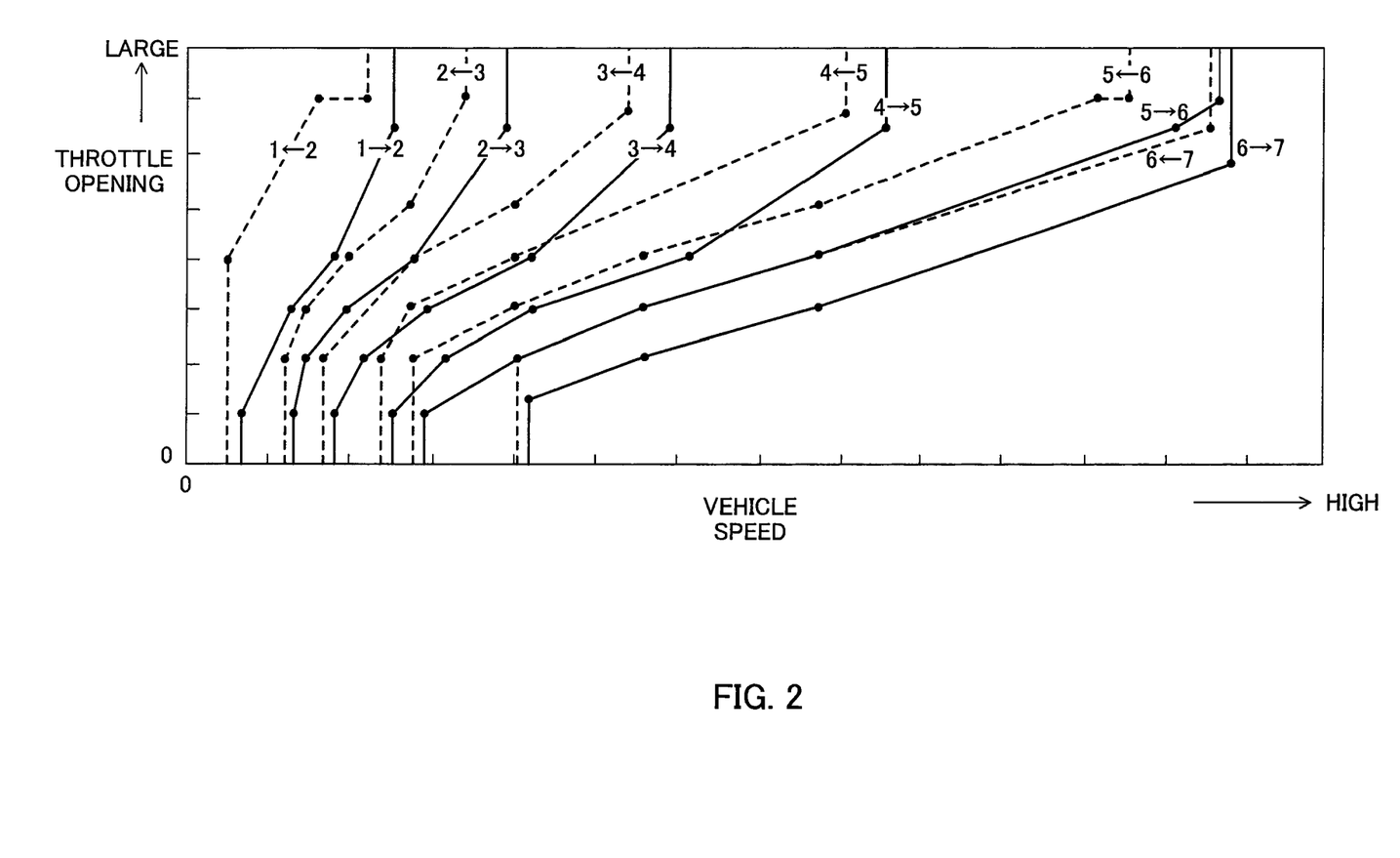
FIG. 2 is a shift line diagram of the automatic transmission.

The automatic transmission constituted as described above switches the gear position between the first through seventh speeds on the basis of the vehicle speed and the throttle opening in accordance with shift lines shown in FIG. 2. In the shift map shown in FIG. 2, a gear position switch is determined when an operating condition determined by the vehicle speed and the throttle opening crosses various upshift lines and various downshift lines. Here, the following problems occur if a look-ahead vehicle speed shifts to the vicinity of an upshift line when the driver presses the accelerator pedal hard such that a kickdown is performed to a lower gear position than a current gear position. These problems will be described with reference to FIGS. 3 and 4.

Figure 3A:
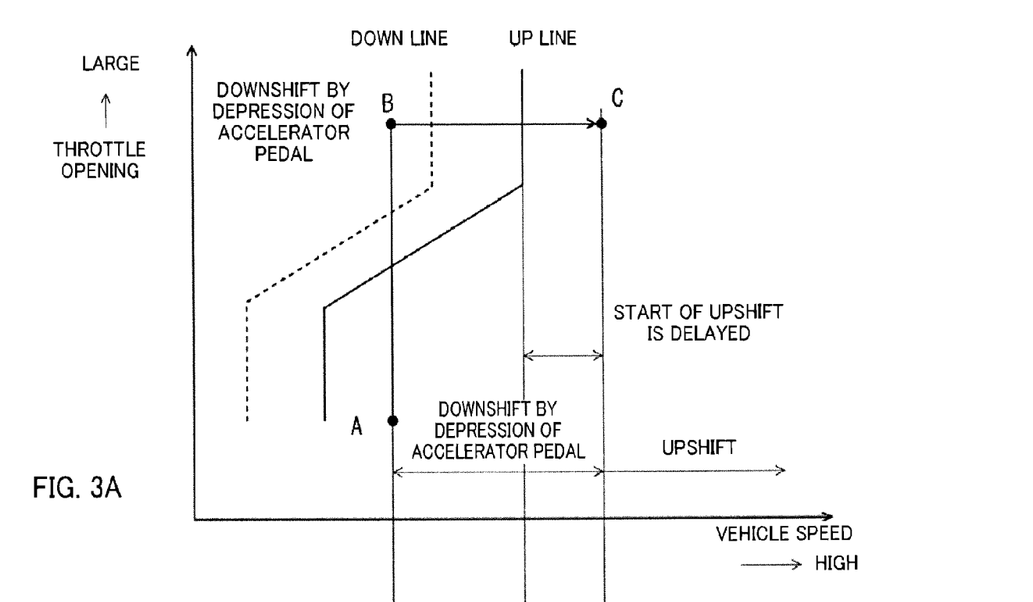
FIG. 3 is a time chart showing problems of a conventional example.
Figure 3B:
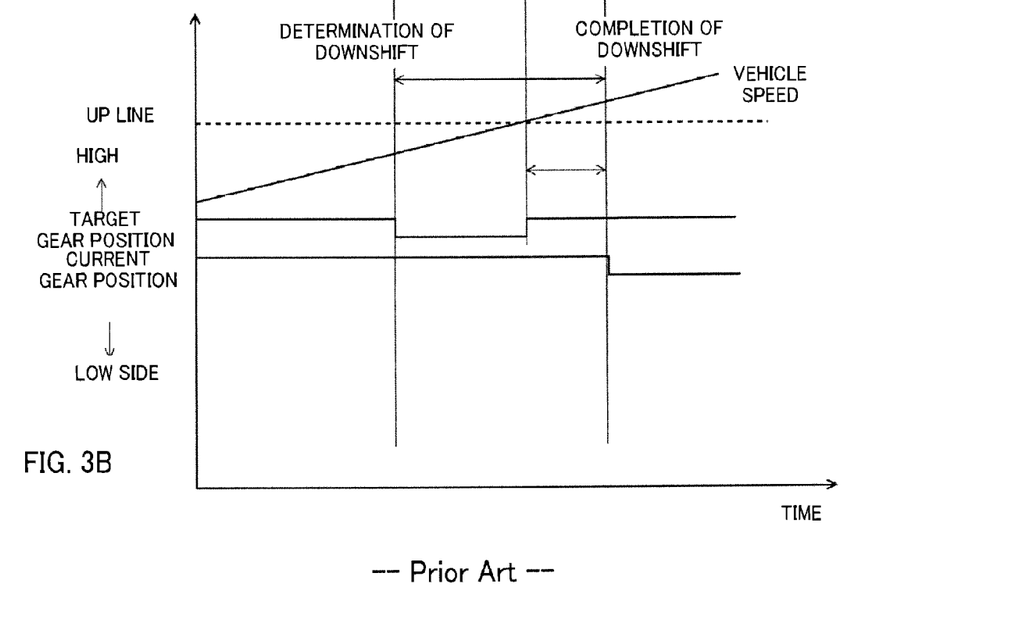
Figure 4A:
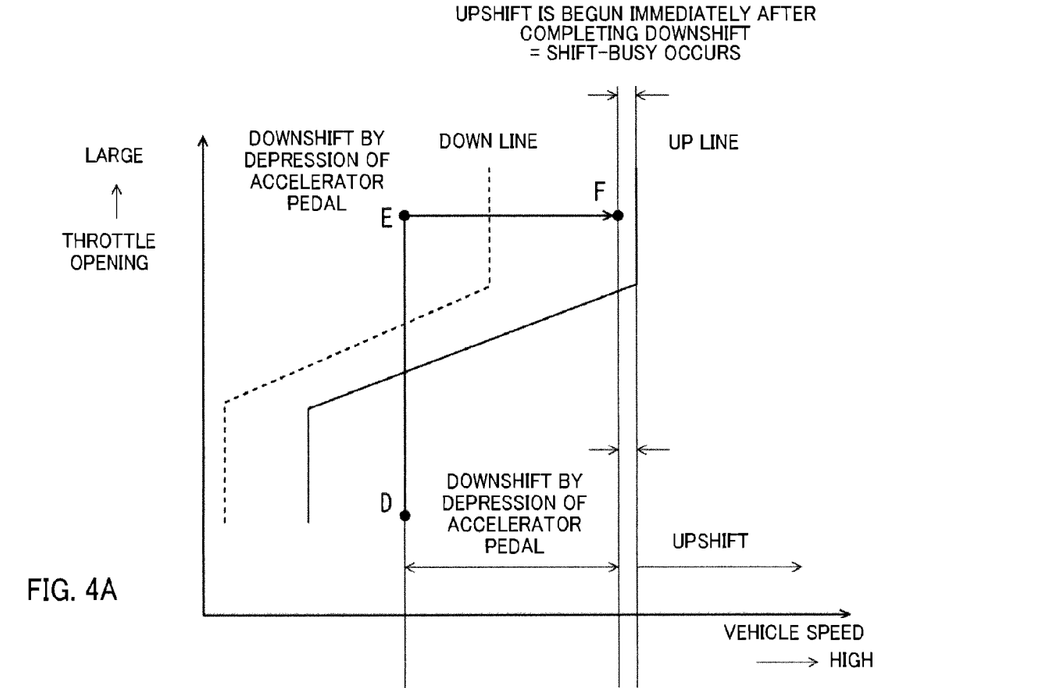
FIG. 4 is a time chart showing problems of the conventional example.
Figure 4B:
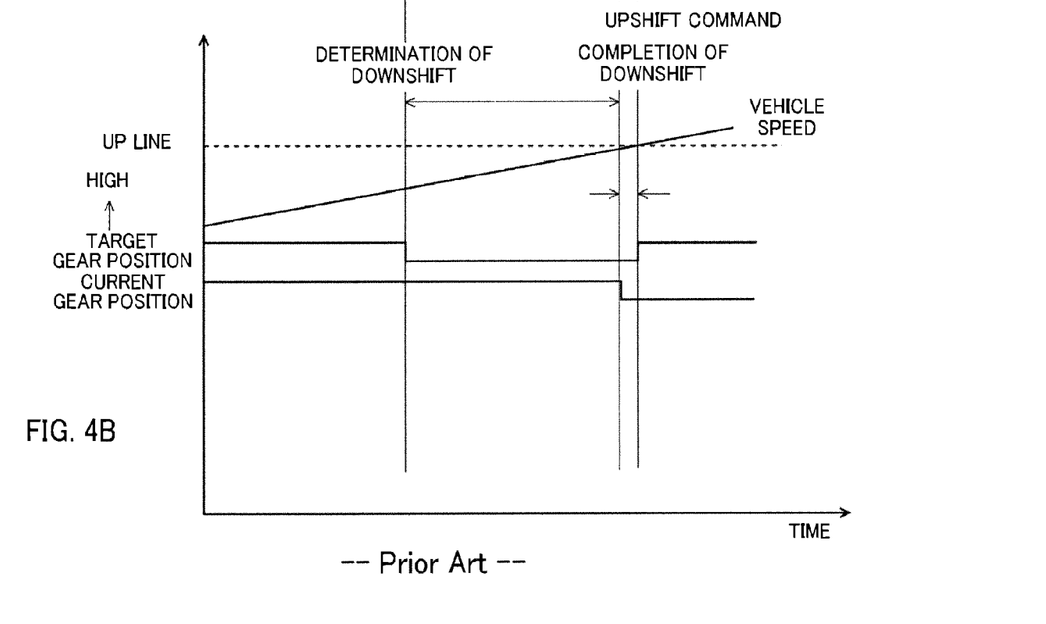

FIGS. 3A and 4A are time charts that indicate a part of the shift map. FIGS. 3B and 4B are time charts that indicate the vehicle speed, a target gear position, and the current gear position. FIGS. 3A and 3B show a case in which the look-ahead vehicle speed shifts to a high vehicle speed side of an up line, and FIGS. 4A and 4B show a case in which the look-ahead vehicle speed shifts to a low vehicle speed side in the vicinity of the up line. It should be noted that in FIGS. 3A, 3B, 4A and 4B, the down line may be any down line, such as a 2→1 down line or a 3→2 down line, and similarly to the down line, the up line may be any up line.

As shown in FIG. 3, when the driver presses the accelerator pedal hard, the throttle opening increases such that the operating condition shifts from a point A to a point B, thereby crossing the down line such that a downshift command is output. When acceleration is comparatively large at this time, the vehicle speed increases immediately such that the operating condition shifts to a point C, thereby crossing the up line. However, the initial downshift is not yet complete when the operating condition crosses the up line, and therefore the upshift begins after the downshift is completed. As a result, the start of the upshift is delayed by the amount of time required to complete the initial downshift after the operating condition crosses the up line, possibly leading to over-revving of the engine rotation.

Further, as shown in FIG. 4, when the driver presses the accelerator pedal hard, the throttle opening increases such that the operating condition shifts from a point D to a point E, thereby crossing the down line such that a downshift command is output. A downshift is then started and completed. When the downshift is complete, the operating condition is at a point F, and therefore the operating condition crosses the up line immediately thereafter. As a result, an upshift is started immediately, causing a shift-busy to occur.

Figure 5:
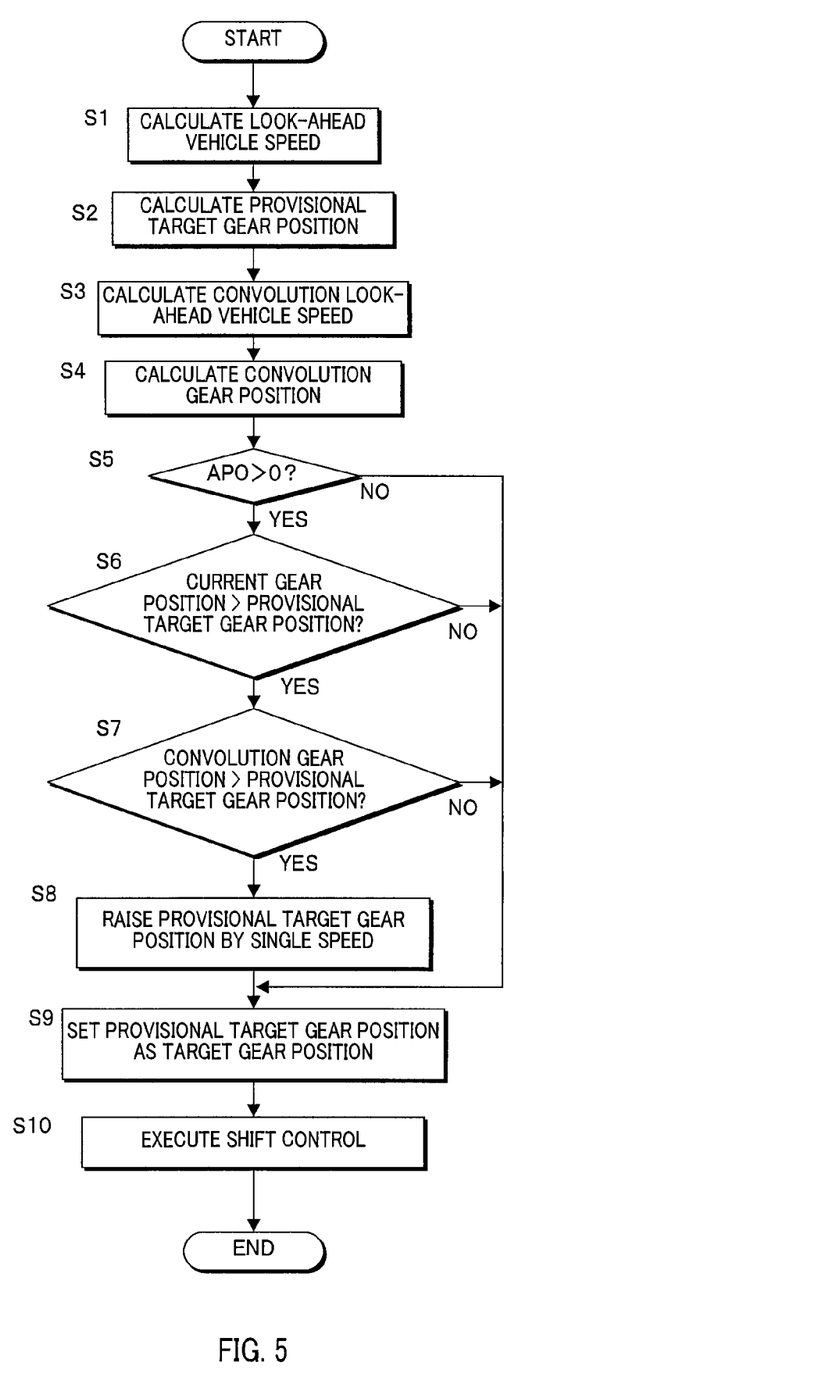
FIG. 5 is a flowchart showing control performed by a shift control device for an automatic transmission according to the embodiment.

To avoid these problems, control shown in the flowchart of FIG. 5 is performed in this embodiment separately to normal shift control. FIG. 5 is a flowchart showing control performed by a shift control device for an automatic transmission according to this embodiment.

In a step S1, the look-ahead vehicle speed is calculated. The look-ahead vehicle speed is calculated as an estimated vehicle speed at the start of an inertia phase on the basis of a torque obtained by subtracting air resistance, rolling resistance, and so on from the torque of the vehicle, taking into account the road surface gradient and so on, as described in JP3-103661A, for example.

In a step S2, a provisional target gear position is calculated. The provisional target gear position is calculated on the basis of the look-ahead vehicle speed and the throttle opening in accordance with the shift map shown in FIG. 2.

Figure 6:
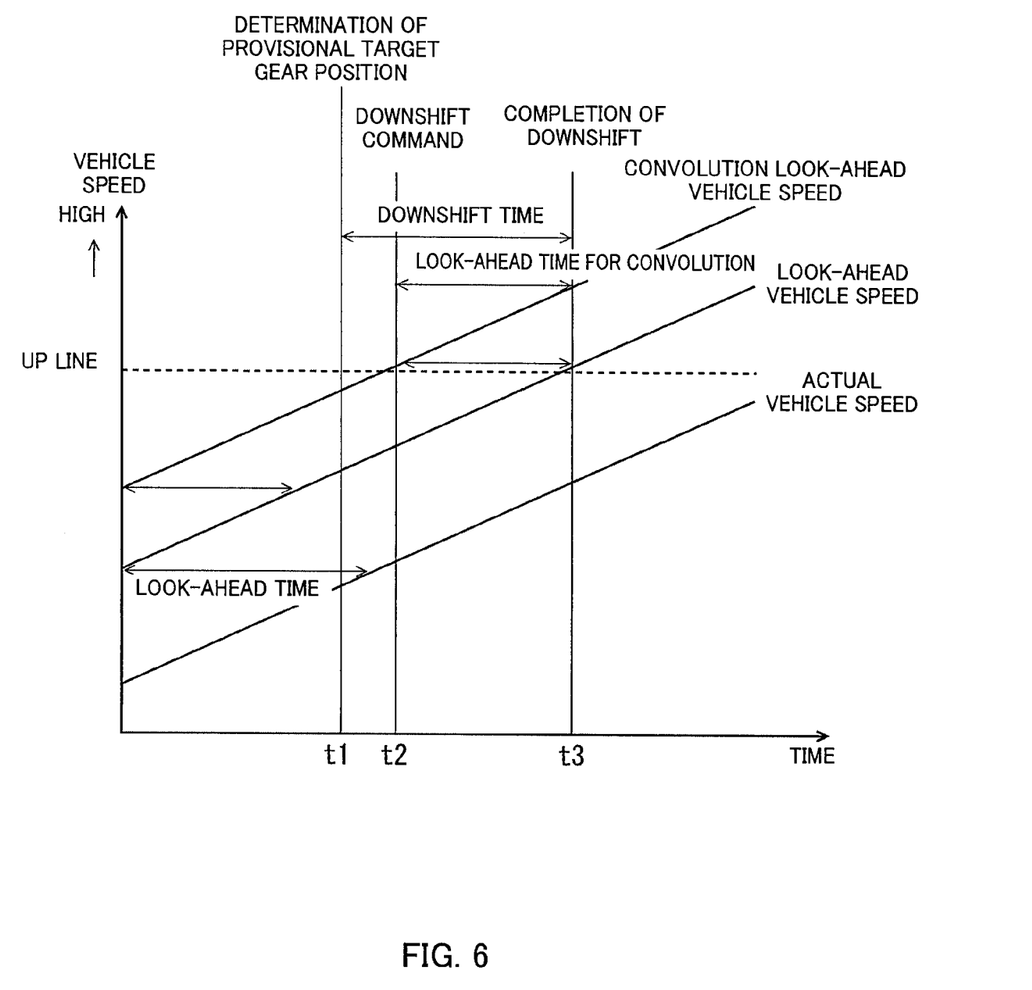
FIG. 6 is a time chart showing an actual vehicle speed, a look-ahead vehicle speed, and a convolution look-ahead vehicle speed.

In a step S3, a convolution look-ahead vehicle speed is calculated. As shown in FIG. 6, the convolution look-ahead vehicle speed is calculated as a vehicle speed at a future time corresponding to the elapsed time from determination of the provisional target gear position to completion of the shift (t3−t1).

In a step S4, a convolution gear position is calculated. The convolution gear position is calculated on the basis of the convolution look-ahead vehicle speed and the throttle opening in accordance with the shift map shown in FIG. 2.

In a step S5, a determination is made as to whether or not the accelerator pedal is depressed. When the accelerator pedal is depressed, the routine advances to a step S6, and when the accelerator pedal is not depressed, the routine advances to a step S9.

In the step S6, a determination is made as to whether or not the provisional target gear position is smaller than the current gear position. When the provisional target gear position is smaller than the current gear position, the routine advances to a step S7, and when the provisional target gear position is equal to or greater than the current gear position, the routine advances to the step S9.

In the step S7, a determination is made as to whether or not the provisional target gear position is smaller than the convolution gear position. When the provisional target gear position is smaller than the convolution gear position, the routine advances to a step S8, and when the provisional target gear position is equal to or greater than the convolution gear position, the routine advances to the step S9.

In the step S8, the provisional target gear position is raised by a single speed.

In the step S9, the provisional target gear position is set as a target gear position.

In a step S10, shift control is executed in accordance with the target gear position.

Figure 7:
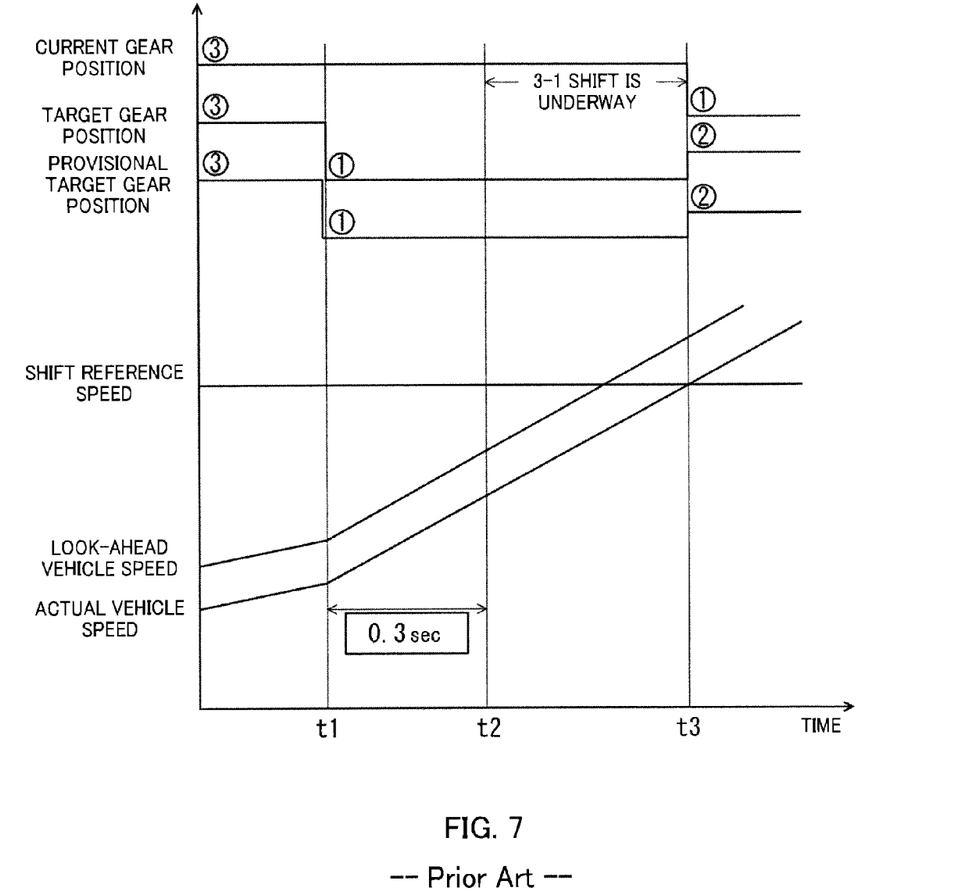
FIG. 7 is a time chart showing problems of the conventional example.
Figure 8:
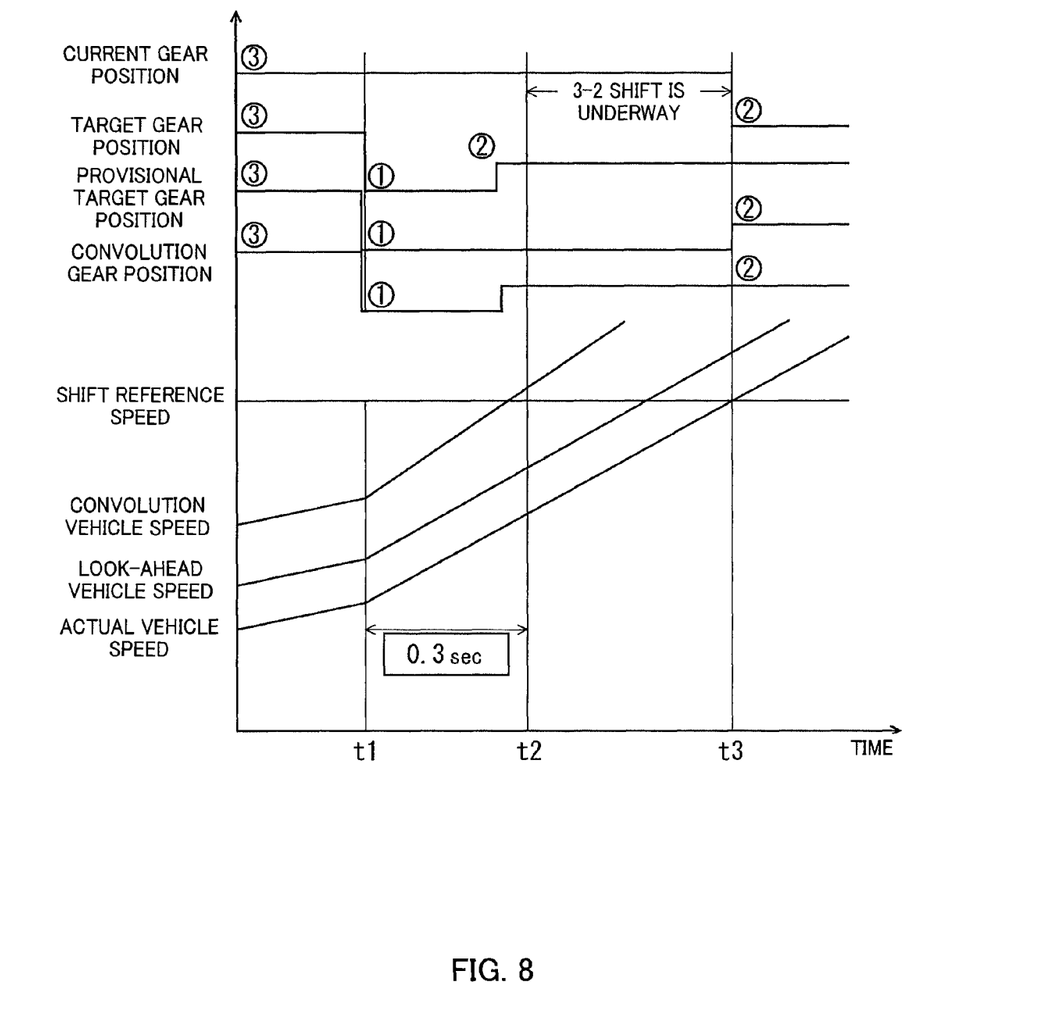
FIG. 8 is a time chart showing actions of the shift control device for an automatic transmission according to the embodiment.

Next, referring to FIGS. 7 and 8, actions of this embodiment will be described. FIG. 7 is a time chart showing variation in the current gear position, target gear position, provisional target gear position, look-ahead vehicle speed, and actual vehicle speed in a conventional example. FIG. 8 is a time chart showing variation in the current gear position, target gear position, provisional target gear position, convolution gear position, convolution vehicle speed, look-ahead vehicle speed, and actual vehicle speed in this embodiment.

First, the conventional example will be described with reference to FIG. 7. When the accelerator pedal is depressed at a time t1 during travel in the third speed, the throttle opening increases, and as a result, the target gear position and provisional target gear position shift from the third speed to the first speed. In other words, a kickdown is required.

At a time t2, a shift from the third speed to the first speed is begun. Thereafter, the vehicle speed increases such that the look-ahead vehicle speed exceeds a shift reference speed. However, since a 3-1 shift is underway, the provisional target gear position is held at the first speed.

At a time t3, the shift from the third speed to the first speed is completed, and the current gear position shifts to the first speed. Further, the actual vehicle speed exceeds the shift reference speed, and therefore the target gear position and provisional target gear position shift from the first speed to the second speed and a shift from the first speed to the second speed is begun. As a result, a shift-busy occurs.

Next, referring to FIG. 8, the actions of this embodiment will be described. When the accelerator pedal is depressed at the time t1 during travel in the third speed, the throttle opening increases, and as a result, the target gear position, provisional target gear position, and convolution gear position shift from the third speed to the first speed. When the vehicle speed increases thereafter such that the convolution vehicle speed exceeds the shift reference speed, the convolution gear position shifts from the first speed to the second speed. Accordingly, the target gear position shifts from the first speed to the second speed.

At the time t2, the target gear position is at the second speed, and therefore a shift from the third speed to the second speed is begun. The vehicle speed then rises such that the look-ahead vehicle speed exceeds the shift reference speed, but since a 3-2 shift is underway, the provisional target gear position is held at the first speed.

At the time t3, the shift from the third speed to the second speed is completed such that the current gear position corresponds to the second speed. Accordingly, the provisional target gear position shifts from the first speed to the second speed. At this time, the gear position is already at the second speed and there is no need for a further shift, and therefore a shift-busy does not occur. Furthermore, a subsequent delayed upshift is not begun.

In the embodiment described above, when it is determined that a kickdown is required, a determination is made as to whether or not an upshift is required before or immediately after completion of a downshift, and when it is determined that an upshift is required, a shift is performed to a higher gear position than the gear position to which the kickdown is performed. As a result, a shift-busy caused by an upshift performed immediately after the downshift can be prevented. Further, over-revving in the engine rotation speed caused when an upshift is required during a downshift and the start of the upshift is delayed can be prevented.

Furthermore, the look-ahead vehicle speed following the elapse of a shift response delay time is estimated, and the convolution look-ahead vehicle speed following the elapse of a downshift time is estimated therefrom. Then, when the provisional target gear position calculated from the look-ahead vehicle speed is lower than the current gear position and lower than the convolution gear position calculated from the convolution look-ahead vehicle speed, the provisional target gear position is raised by a single speed and set as the target gear position of the automatic transmission. As a result, shift-busy and over-revving can be prevented even more reliably.

This application claims priority from Japan Patent Application 2008-57987, filed Mar. 7, 2008, which is incorporated herein by reference in its entirety.

What is claimed is:

1. A shift control device for an automatic transmission, comprising:
   a shift map defined by an engine load and a vehicle speed and divided into gear position regions by shift lines;
   a target gear position setting unit that sets a target gear position according to the region of the shift map in which an operating condition, which is determined by the engine load and the vehicle speed, is located;
   a shift control unit that performs shift control on the basis of the target gear position;
   a vehicle speed estimating unit that estimates the vehicle speed following the elapse of a time required to shift to a first gear position on a low speed side of a current gear position when the engine load increases such that a shift to the first gear position is required; and
   a second gear position setting unit that sets a second gear position from the estimated vehicle speed and the engine load on the basis of the shift map,
   wherein the target gear position setting unit sets a gear position on a high speed side of the first gear position as the target gear position when the first gear position is on the low speed side of the second gear position.

2. The shift control device for an automatic transmission as defined in claim 1, further comprising:
   a first vehicle speed estimating unit that estimates a first vehicle speed, which is a vehicle speed at the start of an inertia phase of a shift to a gear position on the low speed side of the current gear position; and
   a second vehicle speed estimating unit that estimates a second vehicle speed, which is a vehicle speed at the end of the shift to a gear position on the low speed side of the current gear position,
   wherein the first gear position is calculated on the basis of the first vehicle speed and the engine load in accordance with the shift map,
   the second gear position is calculated on the basis of the second vehicle speed and the engine load in accordance with the shift map, and
   the target gear position setting unit sets a gear position on the high speed side of the first gear position as the target gear position when the first gear position is on the low speed side of the current gear position and on the low speed side of the second gear position.

3. A shift control method for an automatic transmission having a shift map defined by an engine load and a vehicle speed and divided into gear position regions by shift lines, the method comprising:
   setting a target gear position according to the region of the shift map in which an operating condition, which is determined by the engine load and the vehicle speed, is located;
   performing shift control on the basis of the target gear position;
   estimating the vehicle speed following the elapse of a time required to shift to a first gear position on a low speed side of a current gear position when the engine load increases such that a shift to the first gear position is required; and
   setting a second gear position from the estimated vehicle speed and the engine load on the basis of the shift map,
   wherein the setting the target gear position sets a gear position on a high speed side of the first gear position as the target gear position when the first gear position is on the low speed side of the second gear position.

4. The shift control method for an automatic transmission as defined in claim 3, further comprising:
   estimating a first vehicle speed, which is a vehicle speed at the start of an inertia phase of a shift to a gear position on the low speed side of the current gear position; and
   estimating a second vehicle speed, which is a vehicle speed at the end of the shift to a gear position on the low speed side of the current gear position,
   wherein the first gear position is calculated on the basis of the first vehicle speed and the engine load in accordance with the shift map,
   the second gear position is calculated on the basis of the second vehicle speed and the engine load in accordance with the shift map, and
   the setting the target gear position sets a gear position on the high speed side of the first gear position as the target gear position when the first gear position is on the low speed side of the current gear position and on the low speed side of the second gear position.

5. A shift control device for an automatic transmission, comprising:
   a shift map defined by an engine load and a vehicle speed and divided into gear position regions by shift lines;
   a target gear position setting means for setting a target gear position according to the region of the shift map in which an operating condition, which is determined by the engine load and the vehicle speed, is located;
   a shift control means for performing shift control on the basis of the target gear position;
   a vehicle speed estimating means for estimating the vehicle speed following the elapse of a time required to shift to a first gear position on a low speed side of a current gear position when the engine load increases such that a shift to the first gear position is required; and
   a second gear position setting means for setting a second gear position from the estimated vehicle speed and the engine load on the basis of the shift map,
   wherein the target gear position setting means for setting a gear position on a high speed side of the first gear position as the target gear position when the first gear position is on the low speed side of the second gear position.

6. The shift control device for an automatic transmission as defined in claim 5, further comprising:
   a first vehicle speed estimating means for estimating a first vehicle speed, which is a vehicle speed at the start of an inertia phase of a shift to a gear position on the low speed side of the current gear position; and
   a second vehicle speed estimating means for estimating a second vehicle speed, which is a vehicle speed at the end of the shift to a gear position on the low speed side of the current gear position,
   wherein the first gear position is calculated on the basis of the first vehicle speed and the engine load in accordance with the shift map, the second gear position is calculated on the basis of the second vehicle speed and the engine load in accordance with the shift map, and the target gear position setting means sets a gear position on the high speed side of the first gear position as the target gear position when the first gear position is on the low speed side of the current gear position and on the low speed side of the second gear position.

* * * * *